United States Patent Office 2,742,461
Patented Apr. 17, 1956

2,742,461
PREGNANES AND METHOD OF PREPARING THE SAME

Seymour Bernstein, Pearl River, N. Y., and Robert H. Lenhard, Ridgefield Park, N. J., assignors to American Cyanamid Company, New York, N. Y., a corporation of Maine No Drawing. Application August 16, 1954,
Serial No. 450,246

9 Claims. (Cl. 260—239.55)

This invention relates to new pregnanes. More particularly, it relates to derivatives of hydrocortisone and methods of preparing the same.

The discovery of the highly desirable activity of cortisone in the treatment of rheumatic diseases and other pathological conditions is now well known. While cortisone and related compounds such as hydrocortisone, are highly active, they produce certain side reactions which are distinctly undesirable and which limit a wider use of such compounds except under careful observation. It is also well known that compounds such as cortisone, when administered to adrenalectomized or adrenalectomized-gonadectomized animals causes distinct involution in the thymus. This affect has been adapted for a bioassay in determining the activity of adrenocortical hormones. The compounds of the present invention, such as pregnane-5α-11β,17α,21-tetrol-3,20-dione, in this assay exhibit activities similar to cortisone and hydrocortisone.

The compounds of the present invention can be illustrated by the following general formula:

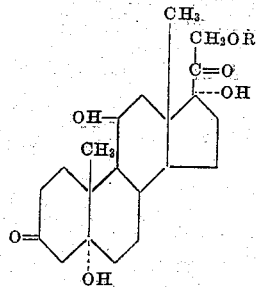

in which R is a member of the group consisting of hydrogen and lower fatty acid acyl radicals, and derivatives thereof in which the 3 and 20-carbonyl group are protected by lower alkylene ketals.

These compounds are moderately soluble in acetone and are relatively insoluble in water. They have comparatively high melting points (usually above 200°).

The compounds of the present invention are prepared by using as starting material bis-lower alkylene ketals of pregnene esters. The general reaction can be illustrated by the following equation:

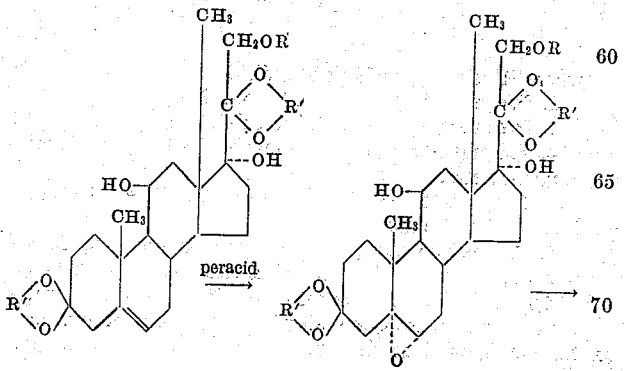

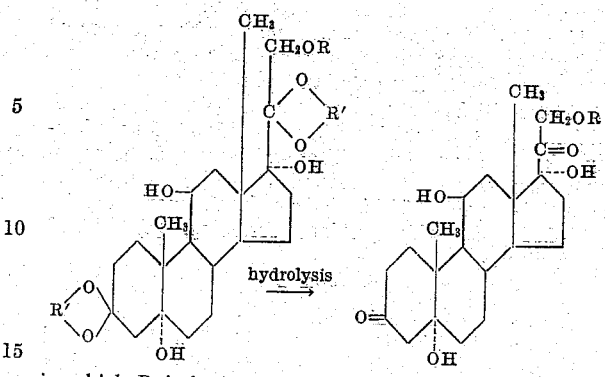

in which R is hydrogen or a lower fatty acid acyl radical and R' is a lower alkylene radical.

In the above reaction R can be an acyl radical such as acetyl, propionyl, butyryl, valeryl, caproyl, and the like. The lower alkylene ketal groups can be, for example, ethylene ketal, propylene ketal, methyl propylene and the like, in which R' would be ethylene, propylene, and methyl propylene, respectively.

In carrying out the present process the Δ⁵-pregnene in a solvent such as chloroform, carbon tetrachloride, ethyl acetate, etc. is treated with a peracid such as perbenzoic acid or monoperphthalic acid at room temperature. The product obtained is the corresponding mixture of pregnane-5,6-oxides, that is the alpha and beta oxides. The mixture of oxides may be resolved by chromatography to produce the alpha and beta oxides in a pure state. Reduction of the alpha oxide with lithium aluminum hydride affords the 5-α-hydroxyl derivative. The latter may also be prepared directly from the mixture of the oxides without preparation. The ketal groups can be removed by hydrolysis as shown hereinafter in the examples to produce pregnane-5α,11β,17α,21-tetrol-3,20-dione.

The following examples describe in detail the preparation of representative compounds of the present invention.

Example 1

Δ⁵-Pregnene-11β,17α,21-triol-3,20-dione 21-acetate 3,20-bisethylene ketal (hydrocortisone acetate bisethylene ketal) (6.23 g.) in chloroform (30 ml.) was treated with perbenzoic acid (1.9 g.) in ethyl acetate (66 ml.) at room-temperature for 5 days. Additional ethyl acetate was added, and the reaction mixture was washed several times with 5% aqueous potassium hydroxide followed by saturated saline and water. After being dried over magnesium sulfate, the extract was evaporated under reduced pressure to afford a white crystalline solid.

The mixture was dissolved in tetrahydrofuran (250 ml.) and ether (50 ml.). Lithium aluminum hydride (3.0 g.) was added and the mixture was refluxed for 4 hours (and then allowed to stand at room-temperature overnight). The excess hydride was decomposed cautiously with water, ethyl acetate was added, and the inorganic precipitate was removed by filtration. The solid was triturated several times with benzene-ethyl acetate. The extracts were combined, washed with saturated saline and water, dried and evaporated under reduced pressure. This afforded a white crystalline solid which was dissolved in pyridine (15 ml.) and acylated with acetic anhydride (seven and one-half ml.) (4 days at room-temperature). The mixture was poured into ice-water, and was extracted with ethyl acetate. The extract was washed with saturated saline and water and was dried over magnesium sulfate. Evaporation under reduced pressure gave a white crystalline solid which was crystallized from acetone-petroleum ether to afford 2.35 g., melting point 207°–227° C., with previous softening. Further recrystallization did not appreciably alter the wide range melting point; melting point 209°–227° C., with previous softening. The latter solid together with its evaporated mother liquor was dissolved in benzene (200 ml.) and absorbed on a silica gel column (120 g., ether washed and re-dried at 110° C.). The product was eluted with one liter of 5% acetone-ether, and was crystallized from acetone-petroleum ether to give practically pure pregnane-5α,11β,-17α,21-tetrol-3,20-dione 21-acetate 3,20-bisethylene ketal, 0.97 g., melting point 228°–230° C., with previous softening. Three further crystallizations from acetone-petroleum ether gave pure pregnane-5α,11β,17α,21-tetrol-3,20-dione 21-acetate 3,20-bisethylene ketal, melting point 231°–233° C., with previous softening; $[\alpha]_D^{24} + 4.1°$ (chloroform).

Example 2

The bisethylene ketal of hydrocortisone acetate (3.0 g.) was dissolved in chloroform (18 ml.) and 1.27 g. of perbenzoic acid in ethyl acetate (25 ml.) was added. The mixture was allowed to stand at room temperature for 6 days. It was then poured into 50 ml. of saturated sodium carbonate and the product was extracted with ethyl acetate. The extract was washed with water, dried and evaporated under reduced pressure. This afforded 3.2 g. of a colorless glass. The glass was dissolved in 25% chloroform-benzene (40 ml.) and was adsorbed on a column of 200 g. of alumina. Elution with 50% chloroform-benzene (200 ml.) gave 300 mg. of crystals (Fraction 1), and elution with 60% chloroform-benzene (400 ml.) gave 1.1 g. of crystals (Fraction 2).

Four crystallizations of Fraction 1 from acetone-petroleum-ether gave 138 mg. of pure pregnane-11β,17α,-21-triol-3,20-dione-5β,6β-oxide 21-acetate 3,20-bisethylene ketal, melting point 206°–207° C.; $[\alpha]_D^{25} + 17°$ (chloroform).

Four crystallizations of Fraction 2 from acetone-petroleum-ether gave 440 mg. of pure pregnane-11β,17α,-21-triol-3,20-dione-5α,6α-oxide 21-acetate 3,20-bisethylene ketal, melting point 259°–261.5° C.; $[\alpha]_D^{25} - 39°$ (chloroform).

Example 3

The 5α,6α-oxide (about 700 mg.) of hydrocortisone acetate bisketal was dissolved in tetrahydrofuran (90 ml.), and lithium aluminum hydride (1.25 g.) was added. The mixture was refluxed for 3 hours, cooled, and was treated cautiously with water. Ethyl acetate (200 ml.) was added and the inorganic precipitate was removed by filtration. The product was worked up by extraction with ethyl acetate. Evaporation gave a white powder which was recrystallized from acetone-petroleum ether. This gave 410 mg. of pregnane-5α,11β,17α,21-tetrol-3,20-dione 3,20-bisethylene ketal, melting point 258°–261° C.

Example 4

This batch of 5α,11β,17α,21-tetrol bisketal was acetylated at room temperature (72 hours) with acetic anhydride (1.5 ml.) with pyridine (4 ml.). Addition of water gave 390 mg. of pregnane-5α,11β,17α,21-tetrol-3,20-dione 21-acetate 3,20-bisethylene ketal, melting point 227°–230° C. Its infrared absorption spectrum was practically identical with that of Example 1.

Example 5

The bisethylene ketal of pregnane-5α,11β,17α,21-tetrol-3,20-dione 21-acetate (0.50 g.) was saponified by being refluxed for one-half hour with two and one-half percent alcoholic potassium hydroxide (12 ml.). Water was added to the cooled solution and it was allowed to stand overnight at 5°. The crystals were collected and washed with water. In this manner there was obtained 0.40 g. of pure pregnane-5α,11β,17α,21-tetrol-3,20-dione 3,20-bisethylene ketal, melting point 261.5°–264° C., with previous softening. Recrystallization from acetone-petroleum ether did not alter the melting point; $[\alpha]_D^{24} + 6.5°$ (chloroform).

Example 6

The bisethylene ketal (0.42 g.) was dissolved in methanol (23 ml.), and was hydrolyzed by being refluxed for 10 minutes with eight and one-half percent (v/v) sulfuric acid (2.3 ml.). Water was added and the solution was neutralized with sodium bicarbonate. The mixture was saturated with salt, and one being scratched gave crystals which were collected by filtration. In this manner there was obtained 0.12 g. of crude pregnane-5α,11β,-17α,21-tetrol-3,20-dione, melting point 251.5°–255° C., with previous softening, browning and decomposition. Two crystallizations from acetone improved the melting point, but did not remove the small amount of $\Delta^4$-3-ketone found present in the crude material. Consequently, the crystalline material, mother liquors and a benzene extract of the reaction mixture were combined and evaporated to dryness. The solid residue was dissolved in methanol (100 ml.), and was extracted ten times with 100 ml. portions of benzene. The aqueous methanol phase was evaporated under reduced pressure (the water was distilled azeotropically with benzene). Several crystallizations from acetone gave 53 mg. of pure pregnane-5α,11β,17α,21-tetrol-3,20-dione, melting point 261°–264° C., with previous softening, browning and decomposition; ultraviolet: λmax none (end absorption only); the material gave a positive Blue Tetrazolium test diagnostic for the α-ketol group; $[\alpha]_D^{24} + 75°$ (pyridine).

Example 7

The free steroid of Example 6 (20 mg.) was dissolved in pyridine (0.5 ml.) and treated with acetic anhydride (0.5 ml.) at room-temperature for 65 hours. Addition of water to the colled mixture gave 14 mg. of pregnane-5α,11β,17α,21-tetrol-3,20-dione 21-acetate, melting point 241°–244° C. with previous softening. Recrystallization from acetone-petroleum ether gave 12 ml., melting point 241°–244.5° C., with previous softening; ultraviolet: λmax none (end absorption only).

We claim:

1. A compound of the group having the general formula:

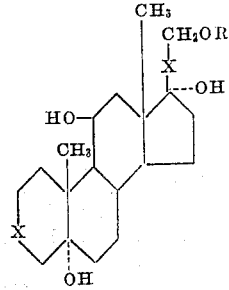

in which R is a member of the group consisting of hydrogen and lower fatty acid acyl radicals and X is a linking group selected from the groups consisting of >C=O and

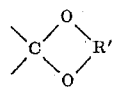

where R' is a lower alkylene radical.

2. Pregnane-5α,11β,17α,21-tetrol-3,20-dione.
3. Pregnane-5α,11β,17α,21-tetrol-3,20-dione 21-acetate.
4. Pregnane-5α,11β,17α,21-tetrol-3,20-dione 3,20-bisethylene ketal.
5. Pregnane-5α,11β,17α,21-tetrol-3,20-dione 21-acetate 3,20-bisethylene ketal.
6. A method of preparing pregnane-5α,11β,17α,21-tetrol-3,20-dione which comprises reacting a Δ5-pregnene-11β,17α,21-triol-3,20-dione-5α,6α-oxide 21-lower fatty acid ester 3,20-bis-lower alkylene ketal with lithium aluminum hydride in the presence of a solvent, adding a mineral acid to hydrolyze the resulting hydroxy pregnane and recovering said compound therefrom.

7. A method of preparing pregnane-5α,11β,17α,21-tetrol-3,20-dione which comprises reacting a Δ⁵-pregnene-11β,17α,21-triol-3,20-dione-5α,6α-oxide 21-acetate 3,20-bis-lower alkylene ketal with aluminum hydride in the presence of a solvent, adding a mineral acid to hydrolyze the resulting hydroxy pregnane and recovering said compound therefrom.

8. A method of preparing pregnane-5α,11β,17α,21-tetrol-3,20-dione which comprises reacting a Δ⁵-pregnene-11β,17α,21-triol-3,20-dione-5α,6α-oxide 21-acetate 3,20-bisethylene ketal with lithium aluminum hydride in the presence of a solvent, adding a mineral acid to hydrolyze the resulting hydroxy pregnane and recovering said compound therefrom.

9. In a method of preparing pregnane-5α,11β,17α,21-tetrol-3,20-dione the steps which comprise reacting pregnane-11β,17α,21-tetrol-3,20-dione-5α,6α-oxide 21-acetate 3,20-bisethylene ketal in tetrahydrofuran in the presence of lithium aluminum hydride, adding a mineral acid and recovering the said compound therefrom.

No references cited.